(12) United States Patent
Gamble et al.

(10) Patent No.: US 6,201,692 B1
(45) Date of Patent: Mar. 13, 2001

(54) DISK DRIVE ENCLOSURE OPTIMIZED FOR MIXED SLIM AND HALF HIGH DRIVE SIZE

(75) Inventors: Eric Thomas Gamble; John Geoffrey Gundlach; Edward John McNulty, all of Raleigh; Brian Alan Trumbo, Cary; Paul Andrew Wormsbecher, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,116

(22) Filed: Mar. 31, 1999

(51) Int. Cl.[7] .............................. G06F 1/16; G11B 33/08
(52) U.S. Cl. ...................... 361/685; 361/728; 361/747; 361/725; 361/732; 312/333; 312/223.3
(58) Field of Search ............................... 361/683–5, 724, 361/735, 728–733, 725–727, 747; 360/97.01, 98.01, 137, 137 D; 312/332.1, 333, 223.2; 369/75.1–82; 439/152–160, 928, 928.1

(56) References Cited

U.S. PATENT DOCUMENTS

| | | | |
|---|---|---|---|
| 4,754,397 | * | 6/1988 | Varaiya et al. ........................ 364/200 |
| 4,833,554 | * | 5/1989 | Dalziel et al. ..................... 360/98.04 |
| 5,067,041 | * | 11/1991 | Cooke et al. ........................ 361/394 |
| 5,112,119 | * | 5/1992 | Cooke et al. ........................ 312/283 |
| 5,124,886 | * | 6/1992 | Golobay ............................... 361/391 |
| 5,212,681 | * | 5/1993 | Bock et al. ........................... 369/244 |
| 5,247,427 | * | 9/1993 | Driscoll et al. ....................... 361/685 |
| 5,515,515 | * | 5/1996 | Kennedy et al. ..................... 395/283 |
| 5,604,662 | * | 2/1997 | Anderson et al. ................... 361/685 |
| 5,652,695 | * | 7/1997 | Schmitt ................................ 361/685 |
| 5,668,696 | * | 9/1997 | Schmitt ................................ 361/685 |
| 5,734,557 | * | 3/1998 | McAnally ............................ 361/727 |
| 5,737,189 | * | 4/1998 | Kammersgard et al. ............ 361/726 |
| 5,822,184 | * | 10/1998 | Rabinovitz ........................... 361/685 |
| 5,921,644 | * | 7/1999 | Brunel et al. ...................... 312/223.2 |
| 6,018,456 | * | 1/2000 | Young et al. ........................ 361/684 |
| 6,049,451 | * | 4/2000 | Schmitt et al. ...................... 361/685 |
| 6,052,278 | * | 4/2000 | Tanzer et al. ........................ 361/685 |
| 6,076,142 | * | 6/2000 | Corrington et al. ................. 711/114 |
| 6,088,222 | * | 7/2000 | Schmitt et al. ...................... 361/686 |
| 6,099,098 | * | 8/2000 | Leong ................................. 312/333 |
| 6,108,198 | * | 8/2000 | Lin ...................................... 361/683 |

FOREIGN PATENT DOCUMENTS

WO 95/08911 * 3/1995 (WO) .............................. H05K/7/10

* cited by examiner

*Primary Examiner*—Leo P. Picard
*Assistant Examiner*—Anatoly Vortman
(74) *Attorney, Agent, or Firm*—Martin J. McKinley

(57) ABSTRACT

A disk drive enclosure houses a mix of "slim" and "half high" disk drive sizes in almost any order. The preferred enclosure includes at least thirteen equi-spaced pairs of guide rails, wherein each pair of rails includes one rail on one side panel of the enclosure, and the other rail of the other side panel of the enclosure. Each pair of guide rails defines a boundary of a "slot", such that twelve slots are defined between thirteen pairs of guide rails. Groups of slots are defined, wherein each group includes six contiguous slots. For each group of six slots, four connectors are included on a back panel of the enclosure. Within each group of six slots, the four connectors are positioned within the first, third, fourth and fifth slots, and no connectors are positioned in the second and sixth slots. A "no go" tab is also placed, adjacent the leading edge of one of the side panels of the enclosure, in the second and sixth slots to prevent the insertion of the rails of a disk drive in these slots. A removable back panel "shuttle" is included, which can be replaced with a different shuttle to easily and inexpensively convert the enclosure to receive a different type of disk drive.

9 Claims, 4 Drawing Sheets

DISK DRIVE ENCLOSURE OPTIMIZED FOR MIXED SLIM AND HALF HIGH DRIVE SIZE

BACKGROUND OF THE INVENTION

This invention pertains to computer systems and other information handling systems and, more particularly, to an enclosure for disk drives into which mixed drive sizes, both slim and half high drives, can be inserted. This invention also pertains to a disk drive enclosure that has a removable backplane shuttle that can be easily replaced with a different shuttle and back plane, so as to easily adapt the enclosure to receive a different drive type, such as hot plug disk drives, non-hot plug drives, drives with SCSI interfaces, or drives with Fibre Channel interfaces.

Two well known industry standard disk drives sizes are the "slim" and "half high" drives. The slim or "1 inch" drive is actually 26.1 mm high, and the half high or "1.6 inch" drive is actually 42 mm high. As the industry matures, newer models of disk drives become available with greater storage capacity than the previous drive model of the same height. Similarly, a large capacity disk drive that was previously only available in the half high drive size, may later be available in the slim size drive. Thus, in the process of upgrading a computer system, or even at the time of the initial purchase of the system, there may be a need to intermix drives of different sizes in the same chassis. Accordingly, the invention described below is a disk drive system that includes a drive enclosure into which mixed drive sizes can be inserted in a manner in almost any order.

Disk drives not only vary in drive height, but also in the electrical and mechanical interface between the drive and the computer system. For example, disk drives may be of the "hot plug" type wherein drives can be inserted into and removed from the system by simply sliding the drive into or out of the drive chassis without the need to turn the system power OFF. Such "hot plug" drives usually have a well known SCSI (Small Computer System Interface) electrical interface, and typically use the well known SCA-2 standard connector. In this system, a mating connector is attached to the back of the drive chassis, so that the drive connector on the back of the drive mates with the chassis connector as the drive is fully inserted into the chassis. Another well known interface that is becoming more popular is the Fibre Channel standard, which can also be "hot plugged" into a drive chassis, but which uses a different connector than the standard SCSI connector. Drives can also be of the more conventional "non-hot plug" variety, in which a connector at the end of a flexible cable (the other end of which is connected to the computer system) is plugged into a mating connector on the drive.

Thus, there is a need for a user to be able to easily and inexpensively upgrade a computer system and, in particular, the disk drive chassis, to change the drive interface type, such as from non-hot plug to SCSI hot plug or Fibre Channel. Accordingly, the invention described below includes a disk drive chassis or enclosure that has a removable back plane shuttle, that can be easily and inexpensively replaced so as to change the type of drive that can be inserted into the enclosure and interfaced to the computer system. This invention is not only advantageous to the user, but also lowers manufacturing cost since only one drive enclosure is required for non-hot plug, SCSI and Fibre Channel drive types.

SUMMARY OF THE INVENTION

Briefly, the invention is a disk drive enclosure for receiving a mix of two disk drive carrier sizes, including a first disk drive carrier size having a first height, and a second disk drive carrier size having a second height, wherein the second height is substantially one and a half times the first height. The enclosure includes a chassis with first and second side panels, wherein each of the side panels includes a front edge and a rear edge, and wherein the first side panel is substantially parallel to and opposes the second side panel. A back panel is connected to the rear edges of the first and second side panels./Twelve equi-spaced pairs of first and second chassis rails, the first rail of each of pair of chassis rails is connected to the first side panel, and the second rail of each pair of chassis rails is connected to the second side panel. Included are two groups of six consecutive slots, wherein each slot is bounded on one side by a first plane passing through a first pair of chassis rails, and on the other side by a second plane passing through a second pair of chassis rails adjacent to the first pair of chassis rails. Two groups of four connectors are included. The first group of connectors is attached to the back panel and positioned within the first group of slots, and the second group of connectors is attached to the back panel and positioned within the second group of slots. The first, second, third and fourth connectors of the first and second groups of connectors are positioned, respectively, in the first, third, fourth and fifth consecutively numbered slots of the first and second groups of slots. No connectors are positioned in the second and sixth slots of each of the first and second groups of slots. Thus, the connector pattern within the first group of slots is repeated within the second group of slots.

DESCRIPTION OF THE ILLUSTRATIVE EMBODIMENT

Figure 1:
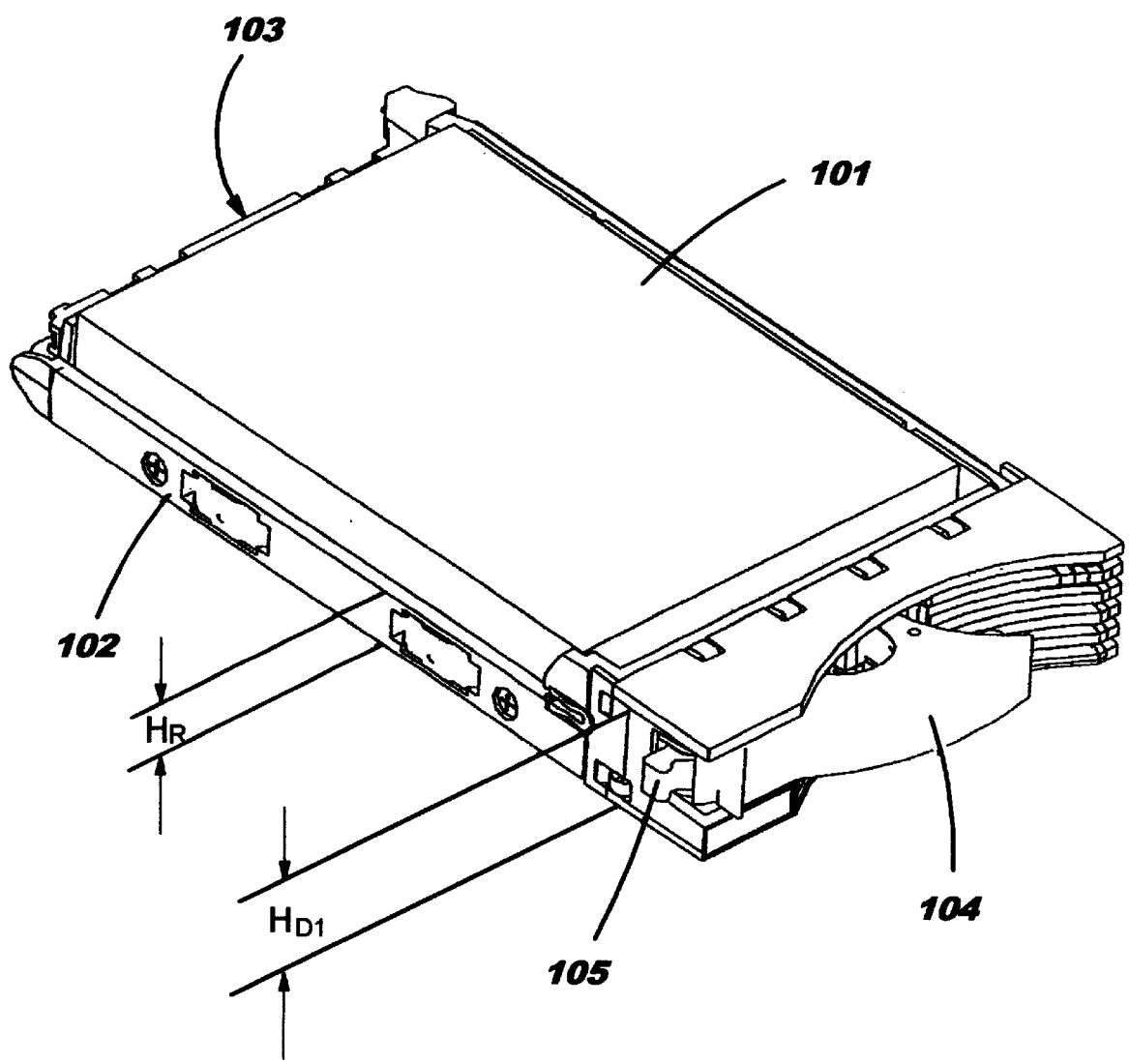
FIG. 1 is a perspective view of a slim or "one third high" disk drive and carrier.

FIG. 1 is a perspective view of a slim or "one third high" hot plug disk drive and carrier. Referring to this figure, a slim size disk drive 101 has a drive height of $H_{D1}$. The industry standard height $H_{D1}$ for slim drive 101 is 26.1 mm, although a slim drive is commonly referred to as a "1 inch" drive. Drive 101 includes a carrier rail 102 having a height $H_R$. Height $H_R$ is equal to the spacing between the chassis guide rails (as described below), less some nominal clearance; 1 mm for example. A well known drive connector 103 (not visible in FIG. 1) mates with a connector in the drive chassis when the drive is fully inserted into the chassis. A handle 104, which is coupled to latch 105, is used to removable secure the disk drive in a chassis or other enclosure.

Figure 2:
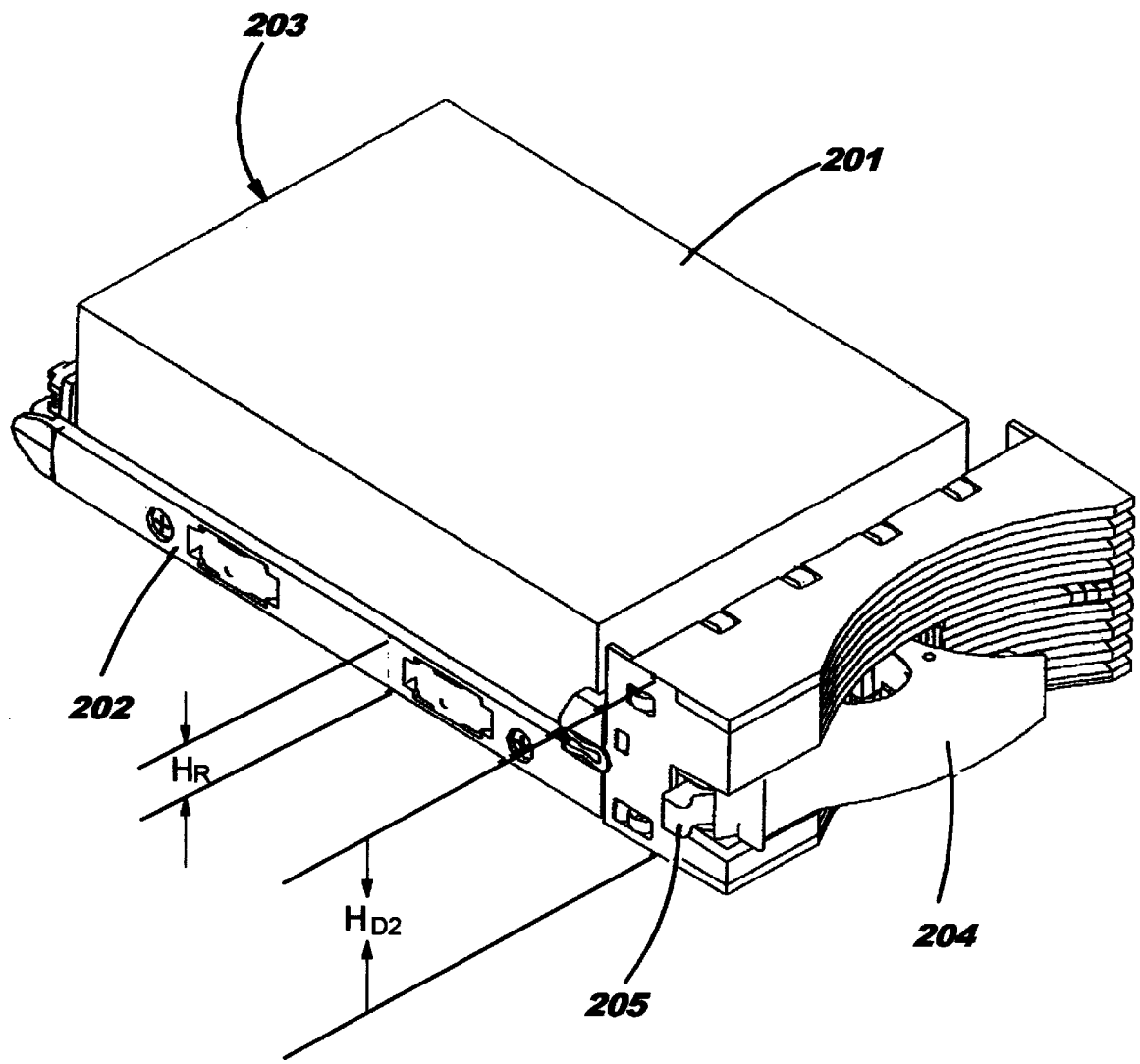
FIG. 2 is a perspective view of a "half high" disk drive and carrier.

FIG. 2 is a perspective view of a "half high" disk drive and carrier. Referring to this figure, a half high size disk drive 201 has a drive height of $H_{D2}$. The industry standard height $H_{D2}$ for half high drive 201 is 42 mm, although a half high drive is commonly referred to as a "1.6 inch" drive. Drive 201 includes a carrier rail 202 also having a height $H_R$. A well known drive connector 203 (not visible in FIG. 2) mates with a connector in the drive chassis when the drive is fully inserted into the chassis. A handle 204, which is coupled to latch 205, is used to removable secure the disk drive in a chassis or other enclosure.

Figure 3:
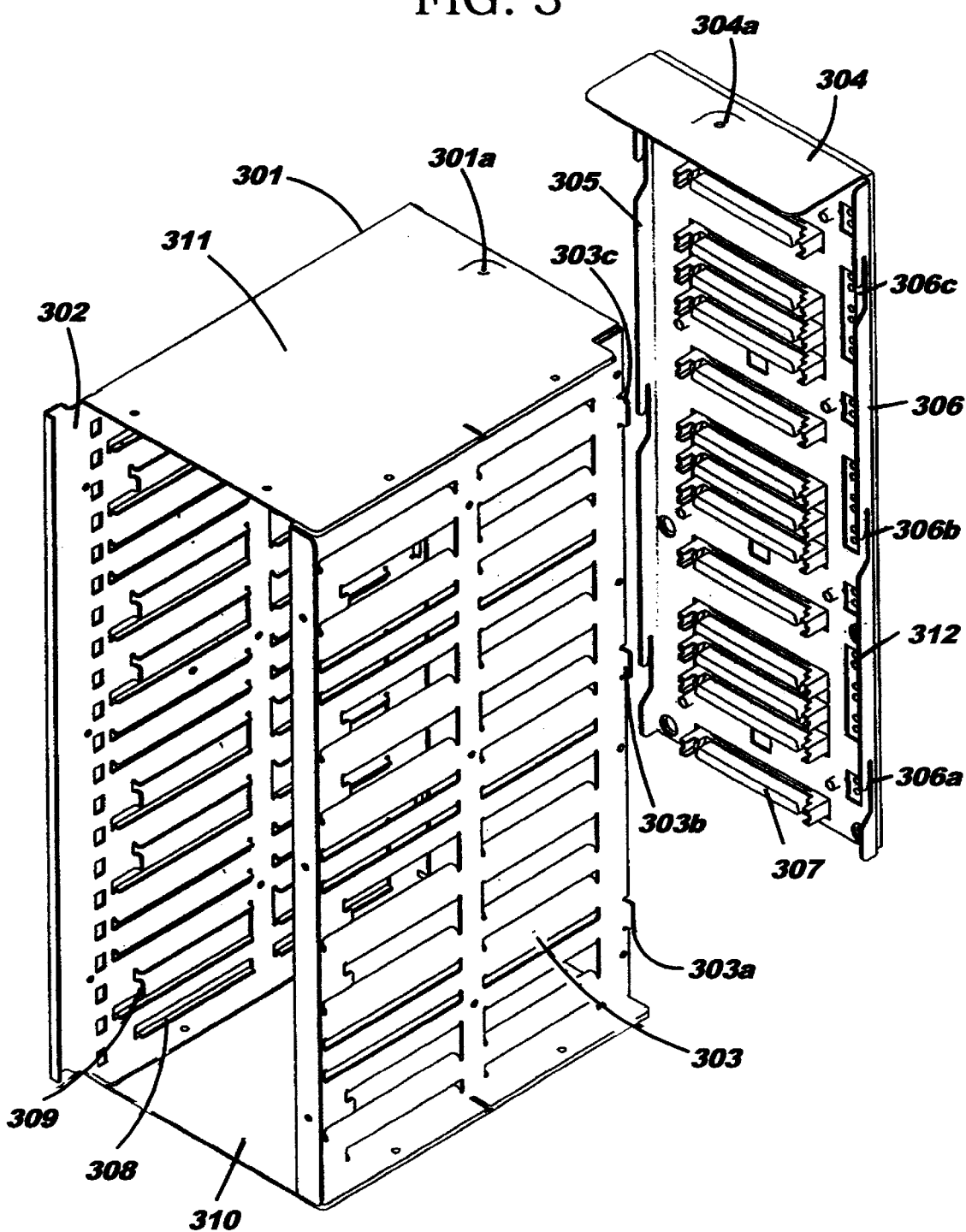
FIG. 3 is a perspective view of a disk drive enclosure of the present invention in which the back plane shuttle is shown disconnected from the enclosure.

FIG. 3 is a perspective view of a disk drive chassis or enclosure of the present invention. Referring to this figure, enclosure 301 includes side panels 302 and 303. Note that the term "side panel" does not refer to the orientation of the panel, and a side panel may be oriented vertically, horizontally or otherwise. A back panel "shuttle" 304 includes flanges 305 and 306. Shuttle 304 is removable attached to enclosure 301 through the use of slots 306a through 306c that engage, respectively, tabs 303a through 303c at the rear edge of side panel 303. Similar slots on flange 305 engage tabs (not visible in FIG. 3) at the rear edge of side panel 302. A screw (not illustrated in FIG. 3) or other well known fastener is inserted through hole 304a and into hole 301 a to secure shuttle 304 to enclosure 301. A multiplicity of connectors, for example connector 307, are attached to a printed circuit or other substrate 312, which is attached to the shuttle 304 and arranged in a repeating pattern that is more fully described with respect to FIG. 4. Preferably, substrate 312 is attached to the back of shuttle 304 so that any variation in the thickness of the material will not reposition the connector with respect to the enclosure. A multiplicity of chassis rails, for example rail 308, are attached to side panels 302 and 303 (the rails attached to side panel 303 are not visible in FIG. 3) and arranged in pairs; one rail of each pair attached to side panel 302, and the other rail of the same pair attached to side panel 303. The chassis rails (e.g., rail 308) are equi-spaced at a distance that is equal to the drive rail height HR plus some small tolerance. Note that the bottom 310 and top 311 panels of enclosure 301 could be considered to be a chassis rail the panel is positioned to guide a drive rail (e.g., drive rail 102) of a disk drive. A plurality of stop tabs or "no go" tabs, for example tab 309, are located adjacent the front edge of side panel 302 to prevent the insertion of a drive rail in the corresponding "slot."

Figure 4:
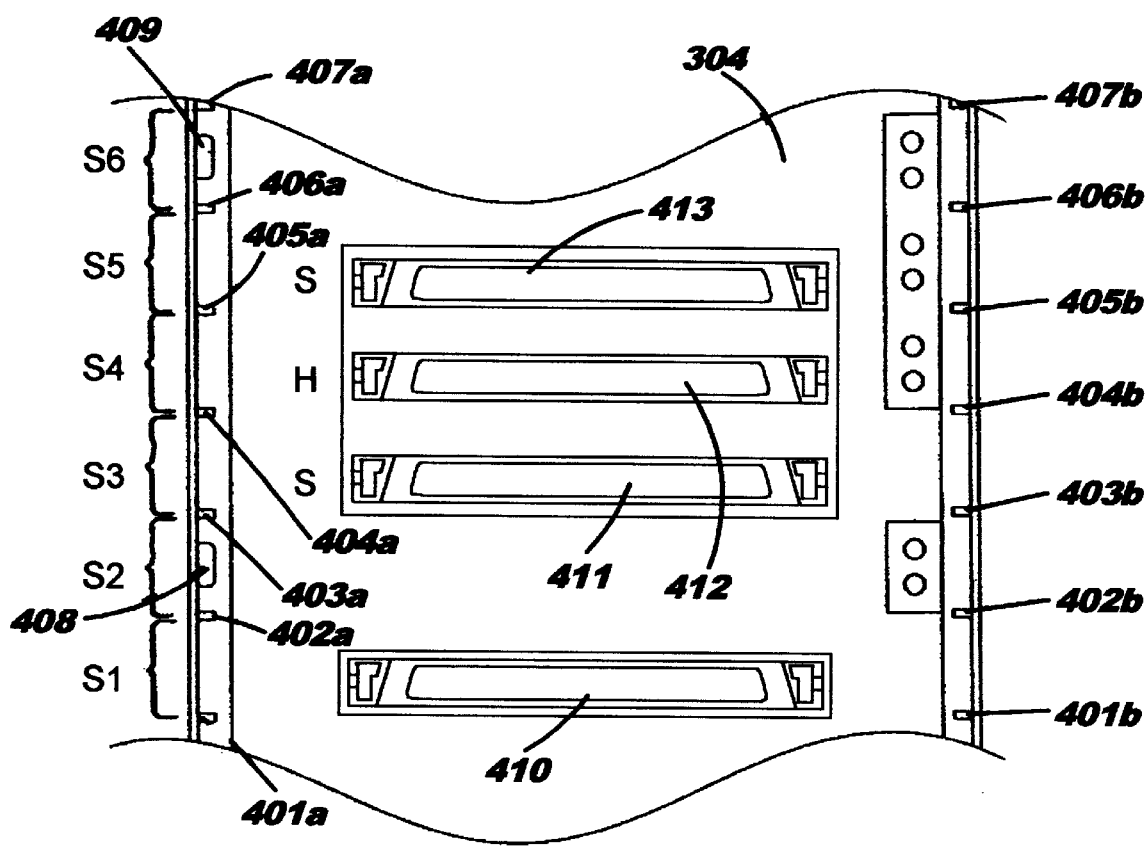
FIG. 4 is a front view of a section of a disk drive enclosure of the present invention illustrating the repeating rail and back plane connector patterns.

FIG. 4 is a front view of a section of a disk drive enclosure of the present invention illustrating the repeating rail and back plane connector patterns. Referring to this figure, back plane shuttle 304 includes seven chassis rail pairs 401a and 401b, 402a and 402b, 403a and 403b, 404a and 404b, 405a and 405b, 406a and 406b, and 407a and 407b. Each pair of chassis rails, for example rails pairs 401a and 401b, may be referred to simple as rail pair 401. The space between any two pairs of adjacent rail pairs 401 through 407 will be referred to as a "slot", so that there are a total of six slots S1 through S6 visible in FIG. 4. Stated another way, a plane passing through each of the two rails in any rail pair 401 through 407 defines one boundary of a slot, while the other boundary of a slot is defined by a second plane passing through an adjacent pair of rails. Slots S1 through S6 define one "group" of slots. Four back plane connectors for mating with drive connectors 103 and 203 are positioned in slots S1, S3, S4 and S5, but no connectors are positioned in slots S2 and S6. Stop tabs 408 and 409 are positioned in slots S2 and S6. This six slot pattern of connectors and stop tabs can be seen to repeat in FIG. 3, and it is this repeating pattern that gives the enclosure the flexibility to intermix slim and half high drives in almost any order without the need to place a connector in each and every slot S1 through S6 of each group of six slots.

We claim as our invention:

1. A disk drive enclosure for receiving a mix of two disk drive carrier sizes, including a first disk drive carrier size having a first height, and a second disk drive carrier size having a second height, the second height being substantially one and a half times the first height, said enclosure comprising:

a chassis having first and second side panels, each of said side panels including a front edge and a rear edge, said first side panel being substantially parallel to and opposing said second side panel;

a back panel connected to said rear edges of said first and second side panels;

twelve equi-spaced pairs of first and second chassis rails, the first rail of each of said pairs of chassis rails being connected to said first side panel, and the second rail of each of said pairs of chassis rails being connected to said second side panel;

first and second groups of six consecutive slots, wherein each slot is bounded on one side by a first plane passing through a first pair of chassis rails, and on the other side by a second plane passing through a second pair of chassis rails adjacent to the first pair of chassis rails;

first and second groups of first, second, third and fourth connectors, said first group of connectors being attached to said back panel and positioned within said first group of slots, said second group of connectors being attached to said back panel and positioned within said second group of slots, wherein the first, second, third and fourth connectors of said first and second groups of connectors are positioned, respectively, in the first, third, fourth and fifth consecutively numbered slots of said first and second groups of slots, such that no connectors are positioned in the second and sixth slots of each of said first and second groups of slots;

whereby the connector pattern within the first group of slots is repeated within the second group of slots.

2. The disk drive enclosure of claim 1, further comprising:

two groups of first and second stop tabs connected to said chassis adjacent the front edge of said first side panel, wherein the first and second stop tabs of said first and second groups of stop tabs are positioned, respectively, within the second and sixth slots of said first and second groups of slots.

3. The disk drive enclosure of claim 1, wherein said back panel is removable, such that said back panel can be replaced with a different back panel to adapt said enclosure to receive a different type of disk drive.

4. The disk drive enclosure of claim 1, wherein said back panel includes a substrate attached to the rear side of said back panel.

5. A disk drive enclosure for receiving a mix of two disk drive carrier sizes, including a first disk drive carrier size having a first height, and a second disk drive carrier size having a second height, the second height being substantially one and a half times the first height, said enclosure comprising:

a chassis having first and second side panels, each of said side panels including a front edge and a rear edge, said first side panel being substantially parallel to and opposing said second side panel;

six equi-spaced pairs of first and second chassis rails, the first rail of each of said pairs of chassis rails being connected to said first side panel, and the second rail of each of said pairs of chassis rails being connected to said second side panel;

six slots, wherein each slot is bounded on one side by a first plane passing through a first pair of chassis rails, and on the other side by a second plane passing through a second pair of chassis rails adjacent to the first pair of chassis rails; and a back panel connected to said rear edges of said first and second side panels, said back panel including four drive connectors positioned in the first, third, fourth and fifth consecutively numbered slots, such that no connector is positioned in the second and sixth slots.

6. The disk drive enclosure of claim 5, further comprising:

two stop tabs connected to said chassis adjacent the front edge of said first side panel, a first one of said stop tabs being positioned in the second slot and a second one of said stop tabs being positioned in the sixth slot.

7. The disk drive enclosure of claim 5, wherein said back panel is removable, such that said back panel can be replaced with a different back panel to adapt said enclosure to receive a different type of disk drive.

8. The disk drive enclosure of claim 5, wherein said back panel includes a substrate attached to the rear side of said back panel.

9. A disk drive enclosure for receiving a mix of two disk drive carrier sizes, including a first disk drive carrier size having a first height, and a second disk drive carrier size having a second height, the second height being substantially one and a half times the first height, said enclosure comprising:

a chassis having first and second side panels, each of said side panels including a front edge and a rear edge, said first side panel being substantially parallel to and opposing said second side panel;

twelve equi-spaced pairs of first and second chassis rails, the first rail of each of said pairs of chassis rails being connected to said first side panel, and the second rail of each of said pairs of chassis rails being connected to said second side panel;

first and second groups of six consecutive slots, wherein each slot is bounded on one side by a first plane passing through a first pair of chassis rails, and on the other side by a second plane passing through a second pair of chassis rails adjacent to the first pair of chassis rails; and first and second groups of first and second stop tabs, said first group of stop tabs being attached to said first side panel and positioned within said first group of slots, said second group of stop tabs being attached to said first side panel and positioned within said second group of slots, wherein the first and second stop tabs of said first and second groups of stop tabs are positioned, respectively, in the second and sixth consecutively numbered slots of said first and second groups of slots, such that no stop tabs are positioned in the first, third, fourth and fifth slots of each of said first and second groups of slots.

* * * * *